United States Patent
Park et al.

(10) Patent No.: US 11,817,608 B2
(45) Date of Patent: Nov. 14, 2023

(54) POLYMER ELECTROLYTE MEMBRANE, MANUFACTURING METHOD THEREFOR, AND ELECTROCHEMICAL DEVICE COMPRISING SAME

(71) Applicant: KOLON INDUSTRIES, INC., Seoul (KR)

(72) Inventors: Jung Hwa Park, Seoul (KR); Dong Hoon Lee, Seoul (KR); Na Young Kim, Seoul (KR); Eun Su Lee, Seoul (KR); Seung Jib Yum, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 106 days.

(21) Appl. No.: 17/609,370

(22) PCT Filed: Jun. 17, 2020

(86) PCT No.: PCT/KR2020/007829
§ 371 (c)(1),
(2) Date: Nov. 6, 2021

(87) PCT Pub. No.: WO2021/006496
PCT Pub. Date: Jan. 14, 2021

(65) Prior Publication Data
US 2022/0320557 A1 Oct. 6, 2022

(30) Foreign Application Priority Data

Jul. 8, 2019 (KR) ........................ 10-2019-0081777

(51) Int. Cl.
| | | |
|---|---|---|
| *H01M 8/1051* | (2016.01) | |
| *C08K 5/092* | (2006.01) | |
| *C08K 5/13* | (2006.01) | |
| *C08K 5/18* | (2006.01) | |
| *H01M 8/1018* | (2016.01) | |
| *H01M 8/1062* | (2016.01) | |
| *H01M 8/1081* | (2016.01) | |
| *H01M 8/10* | (2016.01) | |

(52) U.S. Cl.
CPC ........... *H01M 8/1051* (2013.01); *C08K 5/092* (2013.01); *C08K 5/13* (2013.01); *C08K 5/18* (2013.01); *H01M 8/1018* (2013.01); *H01M 8/1062* (2013.01); *H01M 8/1081* (2013.01); *H01M 2008/1095* (2013.01)

(58) Field of Classification Search
CPC ............ C08K 5/092; C08K 5/13; C08K 5/18; H01M 2008/1095; H01M 8/1018; H01M 8/1051; H01M 8/1062; H01M 8/1081
See application file for complete search history.

(56) References Cited

U.S. PATENT DOCUMENTS

2013/0177834 A1 7/2013 Lee

FOREIGN PATENT DOCUMENTS

| | | |
|---|---|---|
| CN | 1744364 A | 3/2006 |
| JP | 2002008680 A | 1/2002 |
| JP | 2002246041 A | 8/2002 |
| JP | 2006049263 A | 2/2006 |
| JP | 2006139942 A | 6/2006 |
| JP | 2007504303 A | 3/2007 |
| JP | 2012064510 A | 3/2012 |
| JP | 2012124157 A | 6/2012 |
| JP | 2014516369 A | 7/2014 |
| JP | 2022539331 A | 9/2022 |
| KR | 20060020282 A | 3/2006 |
| KR | 20070020167 A | 2/2007 |
| KR | 20070099277 A | 10/2007 |
| KR | 20130112976 A | 10/2013 |
| KR | 20150070577 A | 6/2015 |
| KR | 20170116314 A | 10/2017 |
| KR | 20180003925 A | 1/2018 |

OTHER PUBLICATIONS

Machine translation KR20150070577A (Year: 2015).*
Machine translation KR20060020282A (Year: 2006).*
JP office action dated Nov. 25, 2022.
KR office action dated Mar. 23, 2022.
The office action dated Sep. 13, 2023 related to the corresponding Chinese Patent application.

* cited by examiner

*Primary Examiner* — Victoria H Lynch
(74) *Attorney, Agent, or Firm* — Harvest IP Law, LLP

(57) ABSTRACT

Disclosed are: a polymer electrolyte membrane which can prevent ionic conductor loss even upon the occurrence of chemical degradation in the ionic conductor according to long term use and thus can be significantly improved in chemical durability; a manufacturing method therefor; and an electrochemical device comprising same. The polymer electrolyte membrane of the present disclosure comprises a polymer electrolyte material. The polymer electrolyte material comprises an ionic conductor and a crosslinker unbound to the ionic conductor. The crosslinker has at least one cross-linkable functional group which can couple with the ionic conductor that has been degraded, thereby causing crosslinking with the ionic conductor.

15 Claims, No Drawings

POLYMER ELECTROLYTE MEMBRANE, MANUFACTURING METHOD THEREFOR, AND ELECTROCHEMICAL DEVICE COMPRISING SAME

CROSS REFERENCE TO RELATED APPLICATIONS

This application is a National Stage of International Application No. PCT/KR2020/007829 filed Jun. 17, 2020, claiming priority based on Korean Patent Application No. 10-2019-0081777 filed Jul. 8, 2019.

TECHNICAL FIELD

The present disclosure relates to a polymer electrolyte membrane, a method for manufacturing the same, and a membrane electrode assembly including the same, and more particularly to a polymer electrolyte membrane that is capable of preventing ion conductors from being lost although the ion conductors are chemically degraded upon long-term use and thereby exhibits greatly improved chemical durability, a method for manufacturing the same, and an electrochemical device including the same.

BACKGROUND ART

As used herein, the term "electrochemical device" encompasses a power-generating device (e.g., a fuel cell) and an energy-saving device (e.g., a redox flow battery, RFB).

A fuel cell that generates electricity through bonding between hydrogen and oxygen has advantages of continuously generating electricity for as long as hydrogen and oxygen are supplied and having efficiency about twice as high as an internal combustion engine because no heat is lost.

In addition, the fuel cell emits fewer pollutants because it directly converts chemical energy generated by bonding between hydrogen and oxygen into electrical energy. Accordingly, the fuel cell has advantages of being environmentally friendly and reducing concerns about resource depletion caused by increased energy consumption.

A stack that actually generates electricity in the fuel cell has a stacked structure of several to dozens of unit cells, each including a membrane-electrode assembly (MEA) and a separator (also referred to as a "bipolar plate"). The membrane-electrode assembly generally includes an anode (also referred to as a "fuel electrode"), a cathode (also referred to as an "air electrode"), and an electrolyte membrane interposed therebetween.

The fuel cell may be classified into an alkaline electrolyte fuel cell, a polymer electrolyte fuel cell (PEMFC) and the like, depending on the state and type of the electrolyte. Among them, the polymer electrolyte fuel cell is receiving attention as a portable power supply for vehicular and domestic use due to the advantages of a low operating temperature of less than 100° C., quick start-up, rapid response, and excellent durability.

Typical examples of the polymer electrolyte fuel cell include a proton exchange membrane fuel cell (PEMFC), which uses hydrogen gas as a fuel, a direct methanol fuel cell (DMFC), which uses liquid methanol as a fuel, and the like.

The reaction occurring in the polymer electrolyte fuel cell will be described in brief.

First, when a fuel such as hydrogen gas is supplied to an anode, the hydrogen at the anode is oxidized to produce a proton ($H^+$) and an electron ($e^-$). The produced proton is transferred to the cathode through the polymer electrolyte membrane, whereas the produced electron is transferred to the cathode through an external circuit. Oxygen supplied to the cathode is bonded to the proton and the electron and is thus reduced, thereby producing water.

Meanwhile, in order to realize commercialization of the polymer electrolyte fuel cell, there are still many technical barriers to be overcome, and the essential factors to be improved include high performance, long lifetime, and low cost. The component having the greatest influence thereon is a membrane electrode assembly. In particular, a polymer electrolyte membrane is one of the key factors that have the greatest influence on the performance and cost of the membrane electrode assembly.

The polymer electrolyte membrane for fuel cells requires high ion conductivity, excellent chemical durability, high mechanical strength, high heat resistance, low hydrogen gas permeability, excellent dimensional stability and the like.

Meanwhile, a redox flow battery (RFB) is a secondary battery that can be used for a long time by being repeatedly charged and discharged through a reversible electrochemical reaction of an electrolyte.

The redox flow battery (RFB) generally includes two types of liquid electrolytes that are isolated from each other via a polymer electrolyte membrane (also referred to as an "ion exchange membrane"). A first liquid electrolyte reaction at an anode is different from a second liquid electrolyte reaction at a cathode, causing a difference in pressure. In order to overcome this pressure difference and to exhibit excellent battery performance even after repeated charging and discharging, the polymer electrolyte membrane requires high ionic conductivity and excellent physical and chemical stability.

A reinforced composite membrane-type polymer electrolyte membrane including a porous support impregnated with an ion conductor has been developed in order to improve the mechanical strength and dimensional stability of the polymer electrolyte membrane for electrochemical devices.

The ion conductor generally has a problem in that chemical resistance is reduced when used for a long time, although this problem varies depending on the application field. As a result, when chemical degradation of the ion conductor occurs, the decomposed ion conductor is leaked (released) from the polymer electrolyte membrane, thus deteriorating the physical properties (particularly, the ionic conductivity) of the polymer electrolyte membrane. In particular, radical end groups and/or ionic end groups leaked (released) due to degradation of the ion conductor cause a chain chemical reaction, leading to rapid degradation of the polymer electrolyte membrane.

In an attempt to prevent degradation of the ion conductor and leakage of the ion conductor caused thereby, the use of a crosslinked ion conductor has been proposed. However, the crosslinked ion conductor has problems of (i) lowering the productivity of the polymer electrolyte membrane and increasing manufacturing costs because separate complicated crosslinking processes are required in order for the ion conductor to have a crosslinked structure, and (ii) of being difficult to apply to a reinforced composite membrane type polymer electrolyte membrane, in which the pores of the porous support must be filled with an ion conductor due to the low fluidity thereof.

DISCLOSURE

Technical Problem

Therefore, the present disclosure has been made in view of the above problems, and is directed to a polymer electrolyte membrane, a method for manufacturing the same, and a membrane electrode assembly including the same.

It is one aspect of the present disclosure to provide a polymer electrolyte membrane that is capable of preventing ion conductors from being lost although the ion conductors are chemically degraded upon long-term use and thereby exhibits greatly improved chemical durability.

It is another aspect of the present disclosure to provide a method for manufacturing a polymer electrolyte membrane that is capable of preventing ion conductors from being lost although the ion conductors are chemically degraded upon long-term use and thereby exhibits greatly improved chemical durability.

It is another aspect of the present disclosure to provide an electrochemical device that is capable of maintaining performance for a long time due to the excellent chemical durability.

In addition to the aspects of the present disclosure described above, other features and advantages of the present disclosure will be described in the following detailed description, as will be clearly understood by those skilled in the art to which the present disclosure pertains.

Technical Solution

In accordance with one aspect of the present disclosure, provided is a polymer electrolyte membrane including a polymer electrolyte material, wherein the polymer electrolyte material contains an ion conductor and a crosslinking agent not bonded to the ion conductor, wherein the crosslinking agent has one or more crosslinking functional groups that are capable of being bonded to the ion conductor upon occurrence of degradation of the ion conductor to thereby cause the degraded ion conductor to be crosslinked.

The crosslinking agent may be represented by Formula 1 below.

$R^1$—X—$R^2$      [Formula 1]

wherein $R^1$ and $R^2$, which are the crosslinking functional groups, are each independently a hydroxyl group (—OH), a carboxyl group (—COOH), or an amine group (—$NH_2$), and X is (i) a substituted or unsubstituted $C_6$-$C_{60}$ arylene group, (ii) a substituted or unsubstituted $C_2$-$C_{20}$ linear, cyclic or branched alkene group, or (iii) a divalent functional group represented by Formula 2 below.

*—Ar—$R^3$—*      [Formula 2]

wherein Ar is a substituted or unsubstituted $C_6$-$C_{60}$ arylene group, and $R^3$ is a substituted or unsubstituted $C_2$-$C_{10}$ linear, cyclic, or branched alkene group.

X may be a substituted or unsubstituted phenylene group, *—$(C_2H_4)_n$—*, or

wherein n is an integer of 1 to 10.

The polymer electrolyte material may contain the crosslinking agent in an amount of 0.05 to 20% by weight based on the total weight thereof.

The polymer electrolyte membrane may further include a porous support having a plurality of pores filled with the polymer electrolyte material.

The porous support may be an expanded film or a nonwoven fibrous web.

A ratio of the apparent volume of the porous support to the total volume of the polymer electrolyte membrane may be 5 to 90%.

The ratio of the apparent volume of the porous support to the total volume of the polymer electrolyte membrane may be 30 to 60%.

The ion conductor may be a fluorine-based ion conductor, a hydrocarbon-based ion conductor, or a mixture thereof.

In accordance with another aspect of the present disclosure, provided is a method for manufacturing a polymer electrolyte membrane, the method including: preparing a mixed solution containing an ion conductor and a crosslinking agent; and forming a polymer electrolyte membrane using the mixed solution, wherein the forming the polymer electrolyte membrane is performed under process conditions at which a bonding between the crosslinking agent and the ion conductor does not occur, and the crosslinking agent has one or more crosslinking functional groups that are capable of being bonded to the ion conductor upon occurrence of degradation of the ion conductor to cause the degraded ion conductor to be crosslinked.

The crosslinking agent may be represented by Formula 1 below.

$R^1$—X—$R^2$      [Formula 1]

wherein $R^1$ and $R^2$, which are the crosslinking functional groups, are each independently a hydroxyl group (—OH), a carboxyl group (—COOH), or an amine group (—$NH_2$), and X is (i) a substituted or unsubstituted $C_6$-$C_{60}$ arylene group, (ii) a substituted or unsubstituted $C_2$-$C_{20}$ linear, cyclic or branched alkene group, or (iii) a divalent functional group represented by Formula 2 below.

*—Ar—$R^3$—*      [Formula 2]

wherein Ar is a substituted or unsubstituted $C_6$-$C_{60}$ arylene group, and $R^3$ is a substituted or unsubstituted $C_2$-$C_{10}$ linear, cyclic, or branched alkene group.

X may be a substituted or unsubstituted phenylene group, *—$(C_2H_4)_n$—*, or

wherein n is an integer of 1 to 10.

A ratio of the weight of the crosslinking agent to the total weight of the ion conductor and the crosslinking agent may be 0.05 to 20% by weight.

The mixed solution may be prepared by (i) dissolving the crosslinking agent in a dispersion of the ion conductor, (ii) dispersing the ion conductor in a solution of the crosslinking agent, (iii) dissolving the crosslinking agent in a solution of the ion conductor, or (iv) dissolving the ion conductor in a solution of the crosslinking agent.

The forming the polymer electrolyte membrane may include: preparing a porous support; impregnating the porous support with the mixed solution; and drying the porous support impregnated with the mixed solution, wherein the drying is performed at a temperature at which a bonding between the crosslinking agent and the ion conductor does not occur.

In accordance with another aspect of the present disclosure, provided is an electrochemical device including: an anode; a cathode; and a polymer electrolyte membrane interposed between the anode and the cathode, wherein the polymer electrolyte membrane includes a polymer electrolyte material, the polymer electrolyte material includes: an ion conductor; and a crosslinking agent not bonded to the ion conductor, and the crosslinking agent has one or more crosslinking functional groups that are capable of being bonded to the ion conductor upon occurrence of degradation of the ion conductor to cause the degraded ion conductor to be crosslinked.

The general description of the present disclosure is provided only for illustration of the present disclosure and does not limit the scope of the present disclosure.

Advantageous Effects

In accordance with the present disclosure, elution of the degraded ion conductor from the polymer electrolyte membrane can be prevented by introducing into the porous support a crosslinking agent that is capable of crosslinking the degraded ion conductor by being bonded to radical end groups and/or ionic end groups produced by degradation of the ion conductor. Accordingly, even if chemical degradation of the ion conductor occurs upon long-term use of the fuel cell, the elution of the ion conductor can be suppressed, and thus the chemical durability of the polymer electrolyte membrane and the electrochemical device including the same can be greatly improved.

In addition, according to the present disclosure, when the ion conductor is degraded to produce the radical end group and/or the ionic end group, the radical end group and/or the ionic end group react immediately with the crosslinking functional group of the present disclosure, so crosslinking of the degraded ion conductor can be forcibly performed without a separate temperature increase process for crosslinking. Therefore, according to the present disclosure, the chemical durability of the polymer electrolyte membrane and the electrochemical device including the same can be greatly improved without causing a decrease in productivity and an increase of production costs attributable to a separate crosslinking process.

In addition, the non-crosslinked ion conductor used in the preparation of the polymer electrolyte membrane in the present disclosure has superior fluidity compared to the crosslinked ion conductor and thus is suitable to manufacture reinforced composite polymer electrolyte membranes including porous supports. Therefore, according to the present disclosure, it is possible to obtain the advantages of excellent mechanical durability and dimensional stability provided by the porous support as well as the advantage of excellent chemical durability provided by the crosslinking agent.

BEST MODE

Hereinafter, embodiments of the present disclosure will be described in detail with reference to the accompanying drawings. However, the following embodiments are illustratively provided merely for clear understanding of the present disclosure, and do not limit the scope of the present disclosure.

The polymer electrolyte membrane of the present disclosure includes a polymer electrolyte material.

The polymer electrolyte material contains an ion conductor and a crosslinking agent not bonded to the ion conductor.

The ion conductor may be a cation conductor having at least one cation exchange group selected from the group consisting of a sulfonic group, a carboxyl group, a boronic group, a phosphoric group, an imide group, a sulfonimide group, a sulfonamide group, and a sulfonyl fluoride group. Specifically, in an embodiment, the ion conductor may be a cation conductor having a sulfonic group and/or a carboxyl group as the cation exchange group.

In addition, the ion conductor may be a fluorine-based ion conductor, a hydrocarbon-based ion conductor, or a mixture thereof.

The fluorine-based ion conductor may have the cation exchange group in the side chain thereof, may contain fluorine in the main chain thereof, and may be a fluorine-based polymer (e.g., poly(perfluorosulfonic acid) or poly(perfluorocarboxylic acid)).

The hydrocarbon-based ion conductor may be a hydrocarbon-based polymer having the cation exchange group in a side chain thereof (e.g., sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone or the like).

The crosslinking agent of the present disclosure has at least one crosslinking functional group selected from the group consisting of a hydroxyl group (—OH), a carboxyl group (—COOH), and an amine group (—NH$_2$).

The crosslinking agent according to an embodiment of the present disclosure may have a molecular weight (a weight average molecular weight when the crosslinking agent is an oligomer) of 1,000 or less. When the crosslinking agent is a polymer having a weight average molecular weight higher than 1,000, a three-dimensional structure may be formed, which may make it difficult for the crosslinking reaction to proceed normally.

Meanwhile, the crosslinking agent preferably does not have a functional group causing a great difference in electron density, such as a sulfonyl group or a sulfonamide group, because there is a high risk of causing degradation in which the bond of a carbon atom adjacent to the S atom is cleaved due to the difference in electron density.

Unlike other kinds of substances called crosslinking agents (for example, multivalent cations such as Al$^{3+}$, Mn$^{2+}$, Mg$^{2+}$, and Zn$^{2+}$, which can be introduced in the form of metal oxides), the crosslinking agent of the present disclosure is present in the polymer electrolyte membrane in a state not bonded to the ion conductor, but, once the ion conductor is degraded due to long-term use of the fuel cell, it can be immediately bonded to the degraded ion conductor via the crosslinking functional group thereof without a separate temperature increase process, thereby causing crosslinking of the degraded ion conductor.

For example, the degradation mechanism of a general hydrocarbon-based ion conductor is as follows, and a fluorine-based ion conductor is also degraded by a similar mechanism if there is a difference in electron density.

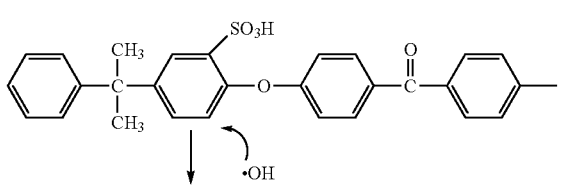

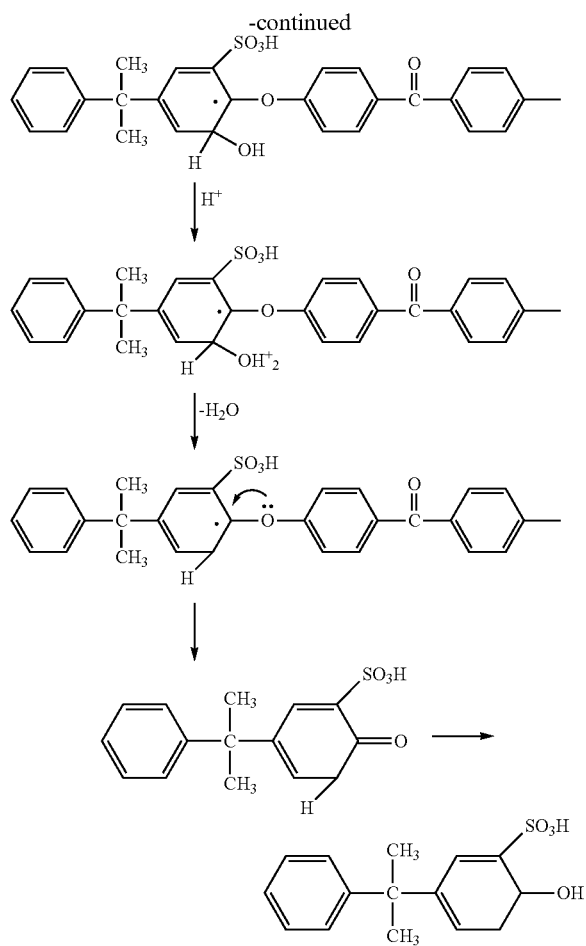

Example of Degradation Mechanism of
Hydrocarbon-Based Ion Conductor

Radical end groups (e.g., —COO·, —CO·, etc.) and/or ionic end groups (e.g., —COO⁻, —O⁻, —CO²⁻, etc.) produced by cleaving of the main chain due to chemical degradation of the ion conductor chemically react with the crosslinking functional groups of the crosslinking agent of the present disclosure to form amide groups or ester groups, thereby crosslinking the degraded ion conductor.

In general, when the temperature is less than 100° C., the crosslinking reaction of the fluorine-based or hydrocarbon-based ion conductor used in the polymer electrolyte membrane for fuel cells is difficult to induce. The radical end groups and/or ionic end groups produced by degradation of the ion conductor react immediately with the crosslinking functional groups of the cross-linking agent of the present disclosure, so cross-linking of the degraded ion conductor can be forcibly performed without a separate temperature increase process for crosslinking.

In an embodiment, the crosslinking agent may be represented by Formula 1 below.

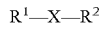   [Formula 1]

wherein $R^1$ and $R^2$, which are the crosslinking functional groups, are each independently a hydroxyl group (—OH), a carboxyl group (—COOH), or an amine group (—NH$_2$), and X is (i) a substituted or unsubstituted $C_6$-$C_{60}$ arylene group, (ii) a substituted or unsubstituted $C_2$-$C_{20}$ linear, cyclic or branched alkene group, or (iii) a divalent functional group represented by Formula 2 below.

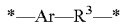   [Formula 2]

wherein Ar is a substituted or unsubstituted $C_6$-$C_{60}$ arylene group, and $R^3$ is a substituted or unsubstituted $C_2$-$C_{10}$ linear, cyclic, or branched alkene group.

More specifically, X may be a substituted or unsubstituted phenylene group, *—(C$_2$H$_4$)$_n$—*, or

wherein n is an integer of 1 to 10.

In an embodiment, the polymer electrolyte material may contain the crosslinking agent in an amount of 0.05 to 20% by weight, based on the total weight thereof.

When the content of the crosslinking agent is less than 0.05% by weight, it is difficult for the crosslinking reaction of the degraded ion conductor to occur effectively. On the other hand, when the content of the crosslinking agent exceeds 20% by weight, a problem occurs in which the crosslinking agent interferes with ion transfer in the polymer electrolyte membrane. In consideration thereof, the content of the crosslinking agent is more preferably 1 to 10% by weight.

The polymer electrolyte membrane of the present disclosure may be (i) a single membrane formed of the polymer electrolyte material or (ii) a reinforced composite membrane in which the pores of the porous support are filled with the polymer electrolyte material.

That is, the reinforced composite polymer electrolyte membrane may further include a porous support having a plurality of pores filled with the polymer electrolyte material.

The ion conductor used in the preparation of the polymer electrolyte membrane of the present disclosure is a non-crosslinked ion conductor having fluidity superior to that of a crosslinked ion conductor, so the pores in the porous support can be easily filled with the ionic conductor. Therefore, a water channel through which hydrogen ions can move is well formed in the thickness direction (through plane) of the porous support, thereby imparting excellent ionic conductivity to the reinforced composite electrolyte membrane, while a channel through which hydrogen gas can move is complicated, thereby imparting relatively low hydrogen gas permeability to the reinforced composite electrolyte membrane.

In an embodiment, the porous support may be an expanded film or a nonwoven fibrous web.

The ratio of the apparent volume of the porous support to the total volume of the polymer electrolyte membrane may be 5 to 90%.

When the ratio is less than 5%, the effect of improving dimensional stability and mechanical durability due to adoption of the porous support is unsatisfactory. On the other hand, when the ratio is higher than 90%, the thickness of the ion conductor layer located on the upper or lower surface of the porous support is excessively small and thus the sheet resistance is increased. In consideration thereof, the ratio of the apparent volume of the porous support to the total volume of the polymer electrolyte membrane is more preferably 30 to 60%.

For the same reason as above, the ratio of the thickness of the porous support to the total thickness of the polymer electrolyte membrane is preferably 5 to 90%, and more preferably 30 to 60%.

In an embodiment of the present disclosure, the porous support may have a thickness of 1 to 50 μm.

When the thickness of the porous support is less than 1 μm, the mechanical strength of the polymer electrolyte membrane may be lowered. On the other hand, when the thickness of the porous support exceeds 50 μm, resistance loss may increase, and weight reduction and integration may be reduced. In consideration thereof, the porous support preferably has a thickness of 2 to 40 μm, more preferably 3 to 30 μm, and still more preferably 3 to 20 μm.

The porosity of the porous support may be 45 to 90%, specifically 60 to 90%. When the porosity of the porous support is less than 45%, the amount of the ion conductor in the porous support is excessively small, increasing the resistance of the polymer electrolyte membrane and decreasing ionic conductivity. On the other hand, when the porosity of the porous support exceeds 90%, dimensional stability is lowered and thus subsequent processing may not proceed smoothly.

The term "porosity" refers to the ratio of the volume of air in the porous support to the total volume of the porous support. The total volume of the porous support can be obtained by measuring the width, length, and thickness of a cuboid sample and multiplying these values, and the volume of air in the support can be obtained by subtracting the volume of the material, obtained by dividing the mass of the sample by the density of the porous support material, from the total volume of the porous support.

Hereinafter, a method for manufacturing the polymer electrolyte membrane according to embodiments of the present disclosure will be described in detail.

The method for manufacturing a polymer electrolyte membrane includes preparing a mixed solution containing an ion conductor and a crosslinking agent, and forming a polymer electrolyte membrane using the mixed solution.

Here, the forming the polymer electrolyte membrane is performed under process conditions at which a bonding between the crosslinking agent and the ion conductor does not occur.

The ion conductor that may be used in the present disclosure may be a fluorine-based ion conductor, a hydrocarbon-based ion conductor, or a mixture thereof, and specific examples of each of the fluorine-based ion conductor and hydrocarbon-based ion conductor have already been described above, and thus a description thereof will be omitted.

The crosslinking agent has one or more crosslinking functional groups that are capable of being bonded to the ion conductor upon occurrence of degradation to thereby cause the degraded ion conductor to be crosslinked. Specific examples of the crosslinking agent have already been described above, and thus a description thereof will be omitted.

As described above, the ratio of the weight of the crosslinking agent to the total weight of the ion conductor and the crosslinking agent may be 0.05 to 20% by weight, more preferably 1 to 10% by weight.

The mixed solution may be prepared by (i) dissolving the crosslinking agent in a dispersion of the ion conductor, (ii) dispersing the ion conductor in a solution of the crosslinking agent, (iii) dissolving the crosslinking agent in a solution of the ion conductor, or (iv) dissolving the ion conductor in a solution of the crosslinking agent.

Each of the solvent of the solution and the dispersion medium of the dispersion may be selected from the group consisting of water, a hydrophilic solvent, an organic solvent, and a mixture of one or more thereof.

The hydrophilic solvent may contain a linear or branched saturated or unsaturated hydrocarbon having 1 to 12 carbon atoms in a main chain, may have one or more functional groups selected from the group consisting of alcohol, isopropyl alcohol, ketone, aldehyde, carbonate, carboxylate, carboxylic acid, ether, and amide, and may contain an alicyclic or aromatic cyclic compound in at least a part of the main chain.

The organic solvent may be N-methylpyrrolidone (NMP), dimethylsulfoxide (DMSO), tetrahydrofuran (THF), dimethylacetamide (DMAC), or a mixture of two or more thereof, but is not limited thereto.

Optionally, the mixed solution may further contain a radical scavenger as an additive. The radical scavenger is an additive that rapidly decomposes peroxides (especially hydrogen peroxide) and/or radicals (especially hydroxyl radicals) that are produced during the operation of the fuel cell and are the major cause of degradation of the ion conductor contained in the polymer electrolyte membrane or the catalyst layer of the anode/cathode. For example, the radical scavenger is (i) at least one transition metal selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), molybdenum (Mo), lanthanum (La) and neodymium (Nd), (ii) at least one noble metal selected from the group consisting of silver (Au), platinum (Pt), ruthenium (Ru), palladium (Pd) and rhodium (Rh), (iii) an ion of the transition metal or noble metal, (iv) a salt of the transition metal or noble metal, and/or (iv) an oxide of the transition metal or noble metal.

However, according to the present disclosure, the addition of such a radical scavenger is not required because the durability of the polymer electrolyte membrane can be improved using a crosslinking agent that can inhibit the progress of the degradation of the ion conductor by being bonded to the degradation site of the ion conductor.

The polymer electrolyte membrane of the present disclosure may be (i) a single membrane formed of the polymer electrolyte material or (ii) a reinforced composite membrane in which the pores of the porous support are filled with the polymer electrolyte material.

The forming the polymer electrolyte membrane to manufacture the reinforced composite-type polymer electrolyte membrane may include preparing a porous support, impregnating the porous support with the mixed solution, and drying the porous support impregnated with the mixed solution.

The drying may be performed at a temperature at which a bonding between the crosslinking agent and the ion conductor does not occur.

In an embodiment, the porous support may be an expanded film or a nonwoven fibrous web.

The expanded film may be formed by forming a support-forming liquid containing, for example, a fluorine-based polymer (e.g., polytetrafluoroethylene (PTFE)) in the form of a film and then expanding the film to form a plurality of pores in the film.

The nonwoven web may be formed with a support-forming liquid containing at least one hydrocarbon-based polymer such as polyolefin (e.g., polyethylene, polypropylene, polybutylene, etc.), polyester (e.g. PET, PBT, etc.), polyamide (e.g., nylon-6, nylon-6,6, aramid, etc.), polyamic acid (formed into a web and then converted to polyimide through imidization), polyurethane, polybutene, polylactic acid, polyvinyl alcohol, polyphenylene sulfide (PPS), polysulfone, fluid crystalline polymers, polyethylene-co-vinyl acetate, polyacrylonitrile, cyclic polyolefin, polyoxymethylene, or polyolefin-based thermoplastic elastomers.

The nonwoven web may be produced by any one method selected from the group consisting of wet-laying, electrospinning, carding, garneting, air-laying, melt blowing, spun-bonding, and stitch bonding.

Then, the porous support thus prepared is impregnated with the mixed solution. The impregnation may be performed by (i) casting the mixed solution on a substrate and then impregnating the porous support with the mixed solution, or (ii) coating the porous support with the mixed solution. The coating may be performed, for example, using bar coating, comma coating, slot die coating, screen printing, spray coating, doctor blade coating, or the like.

Then, in order to remove the solvent of the mixed solution and dispersion medium, the porous support impregnated with the mixed solution is dried. It should be noted that the drying is performed at a temperature lower than the melting point of the porous support and at a temperature at which a bonding between the crosslinking agent and the ion conductor does not occur.

Hereinafter, the membrane electrode assembly of the present disclosure will be described in detail.

The membrane electrode assembly of the present disclosure includes an anode, a cathode, and a polymer electrolyte membrane interposed between the anode and the cathode.

At the anode to which hydrogen gas is supplied, the hydrogen is oxidized to produce a proton ($H^+$) and an electron ($e^-$). The produced proton is transferred to the cathode through the polymer electrolyte membrane, whereas the produced electron is transferred to the cathode through an external circuit.

At the cathode to which oxygen is supplied, the oxygen is bonded to the proton and electron and is thus reduced, thereby producing water.

The anode and the cathode of the membrane electrode assembly of the present disclosure are not particularly limited, and the anode and the cathode of a conventional membrane electrode assembly for fuel cells may be used herein.

The polymer electrolyte membrane of the present disclosure disposed between the anode and the cathode has been described in detail above, and thus a detailed description thereof will be omitted.

Hereinafter, the present disclosure will be described in more detail with reference to specific examples. However, the following examples are provided only for better understanding of the present disclosure and should not be construed as limiting the scope of the present disclosure.

Example 1

Benzenediol was dissolved in a PFSA resin dispersion to prepare a mixed solution (weight ratio of PFSA:benzenediol=95:5). An e-PTFE porous film having a thickness of about 12 μm was wetted with the mixed solution, followed by drying, to prepare a polymer electrolyte membrane.

Example 2

A polymer electrolyte membrane was prepared in the same manner as in Example 1, except that benzenedicarboxylic acid was used instead of the benzenediol.

Example 3

A polymer electrolyte membrane was prepared in the same manner as in Example 1, except that phenylenediamine was used instead of the benzenediol.

Example 4

A polymer electrolyte membrane was prepared in the same manner as in Example 1, except that a 10 wt % sulfonated polyarylethersulfone (S-PAES) solution (solvent: DMAC) was used instead of the PFSA resin dispersion.

Comparative Example 1

A polymer electrolyte membrane was prepared in the same manner as in Example 1, except that the e-PTFE porous film was wetted with a PFSA resin dispersion instead of the mixed solution.

Comparative Example 2

A polymer electrolyte membrane was prepared in the same manner as in Example 1, except that the e-PTFE porous film was wetted with a 10 wt % sulfonated polyarylethersulfone (S-PAES) solution (solvent: DMAC) instead of the mixed solution.

The chemical durability of each of the polymer electrolyte membranes prepared in Examples and Comparative Examples above was evaluated and measured in the following manner and the results are shown in Table 1 below.

[Measurement of Chemical Durability of Polymer Electrolyte Membrane]

In order to evaluate the durability of the polymer electrolyte membrane, a Fenton's test, which is a method for evaluating accelerated chemical degradation, was performed. That is, a polymer electrolyte membrane sample (5 cm×5 cm) was immersed in an aqueous solution containing 10 ppm of $FeSO_4$ and 30 wt % of $H_2O_2$ and then allowed to react with stirring at 80° C. for 24 hours. In the Fenton's test, $H_2O_2$ forms a hydroxyl radical via Fe' as a catalyst, and the radical acts as a factor causing degradation of the polymer electrolyte, thereby accelerating degradation and causing leakage of the polymer electrolyte and thus membrane thickness reduction and membrane weight loss.

The thickness and weight of the polymer electrolyte membrane were measured before and after the test and the degree of degradation was determined based on the thickness reduction according to the test execution and the weight loss ratio calculated according to the following equation.

*Weight loss ratio (%)=[(Wo−Wa)/Wo]×100 wherein Wo is the weight before the test and Wa is the weight after the test.

TABLE 1

| | Initial membrane thickness (μm) | Membrane thickness reduction (μm) | Weight loss ratio (%) |
|---|---|---|---|
| Example 1 | 25 | 0 | 1.7 |
| Example 2 | 25 | 0 | 1.4 |
| Example 3 | 25 | 0 | 2.9 |
| Example 4 | 25 | 0 | 3.4 |
| Comparative Example 1 | 25 | 2 | 10.2 |
| Comparative Example 2 | 25 | 4 | 12.4 |

As can be seen from Table 1 above, the polymer electrolyte membranes according to Examples according to the present disclosure had much higher chemical durability than the polymer electrolyte membranes of Comparative Examples.

The invention claimed is:

1. An electrochemical device comprising:
   an anode;
   a cathode, and
   a polymer electrolyte membrane interposed between the anode and the cathode,
   wherein the polymer electrolyte membrane comprises a polymer electrolyte material,
   wherein the polymer electrolyte material comprises:
   an ion conductor; and
   a crosslinking agent not bonded to the ion conductor, and
   wherein the crosslinking agent has one or more crosslinking functional groups that are capable of being bonded to the ion conductor upon occurrence of degradation of the ion conductor to thereby cause the degraded ion conductor to be crosslinked.

2. The electrochemical device according to claim 1, wherein the crosslinking agent is represented by Formula 1 below:

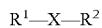  [Formula 1]

wherein $R^1$ and $R^2$, which are the crosslinking functional groups, are each independently a hydroxyl group (—OH), a carboxyl group (—COOH), or an amine group (—$NH_2$); and
   X is (i) a substituted or unsubstituted $C_6$-$C_{60}$ arylene group, (ii) a substituted or unsubstituted $C_2$-$C_{20}$ linear, cyclic or branched alkene group, or (iii) a divalent functional group represented by Formula 2 below:

  [Formula 2]

wherein Ar is a substituted or unsubstituted $C_6$-$C_{60}$ arylene group; and
   $R^3$ is a substituted or unsubstituted $C_2$-$C_{10}$ linear, cyclic, or branched alkene group.

3. The electrochemical device according to claim 1, wherein the crosslinking agent is represented by Formula 1 below,

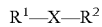  [Formula 1]

wherein $R^1$ and $R^2$, which are the crosslinking functional groups, are each independently a hydroxyl group (—OH), a carboxyl group (—COOM), or an amine group (—$NH_2$),
   wherein X is a substituted or unsubstituted phenylene group, *—$(C_2H_4)_n$—*, or

and
   wherein n is an integer of 1 to 10.

4. The electrochemical device according to claim 1, wherein the polymer electrolyte material comprises the crosslinking agent in an amount of 0.05 to 20% by weight based on the total weight thereof.

5. The electrochemical device according to claim 1, wherein the polymer electrolyte membrane further comprises a porous support having a plurality of pores filled with the polymer electrolyte material.

6. The electrochemical device according to claim 5, wherein the porous support is an expanded film or a nonwoven fibrous web.

7. The electrochemical device according to claim 5, wherein a ratio of an apparent volume of the porous support to a total volume of the polymer electrolyte membrane is 5 to 90%.

8. The electrochemical device according to claim 5, wherein a ratio of an apparent volume of the porous support to a total volume of the polymer electrolyte membrane is 30 to 60%.

9. The electrochemical device according to claim 1, wherein the ion conductor is a fluorine-based ion conductor, a hydrocarbon-based ion conductor, or a mixture thereof.

10. A method for manufacturing an electrochemical device the method comprising:
    manufacturing a polymer electrolyte membrane; and
    interposing the polymer electrolyte membrane between an anode and a cathode,
    wherein the manufacturing the polymer electrolyte membrane comprises:
    preparing a mixed solution comprising an ion conductor and a crosslinking agent; and
    forming a polymer electrolyte membrane using the mixed solution,
    wherein the forming the polymer electrolyte membrane is performed under process conditions at which a bonding between the crosslinking agent and the ion conductor does not occur such that the polymer electrolyte membrane is interposed between the anode and the cathode without the crosslinking agent and the ion conductor bonded to each other, and
    wherein the crosslinking agent has one or more crosslinking functional groups that are capable of being bonded to the ion conductor upon occurrence of degradation of the ion conductor to thereby cause the degraded ion conductor to be crosslinked.

11. The method according to claim 10, wherein the crosslinking agent is represented by Formula 1 below:

  [Formula 1]

wherein $R^1$ and $R^2$, which are the crosslinking functional groups, are each independently a hydroxyl group (—OH), a carboxyl group (—COOH), or an amine group (—$NH_2$); and
    X is (i) a substituted or unsubstituted $C_6$-$C_{60}$ arylene group, (ii) a substituted or unsubstituted $C_2$-$C_{20}$ linear, cyclic or branched alkene group, or (iii) a divalent functional group represented by Formula 2 below:

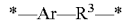  [Formula 2]

wherein Ar is a substituted or unsubstituted $C_6$-$C_{60}$ arylene group; and
    $R^3$ is a substituted or unsubstituted $C_2$-$C_{10}$ linear, cyclic, or branched alkene group.

12. The method according to claim 11, wherein the crosslinking agent is represented by Formula 1 below

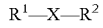  [Formula 1]

wherein $R^1$ and $R^2$, which are the crosslinking functional groups are each independently a hydroxyl group (—OH), a carboxyl group (—COOH), or an amine group (—$NH_2$),
    wherein X is a substituted or unsubstituted phenylene group, *—$(C_2H_4)_n$—*, or

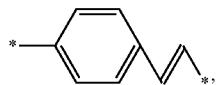 [SMILES: */C=C/c1ccc(*)cc1]

and wherein n is an integer of 1 to 10.

13. The method according to claim 10, wherein a ratio of a weight of the crosslinking agent to a total weight of the ion conductor and the crosslinking agent is 0.05 to 20% by weight.

14. The method according to claim 10, wherein the mixed solution is prepared by (i) dissolving the crosslinking agent in a dispersion of the ion conductor, (ii) dispersing the ion conductor in a solution of the crosslinking agent, (iii) dissolving the crosslinking agent in a solution of the ion conductor, or (iv) dissolving the ion conductor in a solution of the crosslinking agent.

15. The method according to claim 10, wherein the forming the polymer electrolyte membrane comprises:
preparing a porous support;
impregnating the porous support with the mixed solution; and
drying the porous support impregnated with the mixed solution,
wherein the drying is performed at a temperature at which a bonding between the crosslinking agent and the ion conductor does not occur.

* * * * *